United States Patent [19]
Keipert

[11] Patent Number: 5,962,120
[45] Date of Patent: *Oct. 5, 1999

[54] ABRASIVE ARTICLE BACK UP PAD WITH FOAM LAYER

[75] Inventor: Steven J. Keipert, Oakdale, Minn.

[73] Assignee: Minnesota Mining & Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/843,791

[22] Filed: Apr. 21, 1997

Related U.S. Application Data

[63] Continuation of application No. 08/567,130, Dec. 4, 1995, abandoned.

[51] Int. Cl.⁶ .................................................. C08G 18/00
[52] U.S. Cl. .................................... 428/317.9; 428/317.5; 521/174
[58] Field of Search ............................. 428/317.9, 317.5, 428/71; 521/174, 155

[56] References Cited

U.S. PATENT DOCUMENTS

| | | |
|---|---|---|
| 2,950,584 | 8/1960 | Welch . |
| 3,574,150 | 4/1971 | Jefferson et al. . |
| 3,600,359 | 8/1971 | Miranda . |
| 3,700,643 | 10/1972 | Smith . |
| 4,609,581 | 9/1986 | Ott . |
| 4,631,220 | 12/1986 | Clifton . |
| 4,844,967 | 7/1989 | Goralski et al. . |
| 4,893,436 | 1/1990 | Rich . |
| 5,254,194 | 10/1993 | Ott et al. . |
| 5,260,344 | 11/1993 | Ashida et al. ..................... 521/174 X |
| 5,284,882 | 2/1994 | Rossio et al. ..................... 521/174 X |
| 5,369,138 | 11/1994 | Gansen ............................. 521/174 X |
| 5,457,138 | 10/1995 | Yuge et al. ........................ 521/174 X |
| 5,461,084 | 10/1995 | Doerge ............................. 521/174 X |
| 5,491,175 | 2/1996 | Miyaganki et al. ................ 521/174 X |
| 5,496,869 | 3/1996 | Williams et al. .................. 521/174 X |
| 5,505,747 | 4/1996 | Cheslb et al. ............................ 51/297 |
| 5,519,068 | 5/1996 | Okada et al. ............................ 521/174 |

FOREIGN PATENT DOCUMENTS

| | | |
|---|---|---|
| 2 114 925 | 9/1983 | United Kingdom . |
| WO 95/19242 | 7/1995 | WIPO . |

OTHER PUBLICATIONS

ASTM D 2240–91, pp. 400–403.

*Primary Examiner*—Daniel Zirker
*Attorney, Agent, or Firm*—Paul W. Busse

[57] ABSTRACT

An abrasive article back up pad having a resilient, open cell polyurethane foam formed as the reaction product of a polyether polyol and an aromatic polyisocyanate, such as an aromatic polyisocyanate including methylene diphenyl diisocyanate ("MDI"), and this foam is attached to the backside of an abrasive article.

29 Claims, 1 Drawing Sheet

ABRASIVE ARTICLE BACK UP PAD WITH FOAM LAYER

This is a continuation of application Ser. No. 08/567,130 filed Dec. 4, 1995, now abandoned.

The invention is generally related to a back up pad for an abrasive article including a highly resilient and durable polyurethane foam layer.

BACKGROUND OF THE INVENTION

Sheet-form abrasive articles, such as coated abrasives, are often used in combination with a back up pad. The back up pad provides support to the abrasive article during abrading. In general, a conventional back up pad used for this purpose typically comprises a pad facing comprising an attachment material such as knitted loop fabric, cloth, vinyl sheeting, hook fabric, and the secured to a resilient polyurethane open cell foam or "body member". The attachment material of the pad facing engages with the back side of the abrasive article to securely hold it during use. The resilient polyurethane foam or "body member" is used to lend certain desirable properties (strength, rigidity, life, flexibility and the like) to the abrasive article during its use, the need for such properties being dependent upon the intended abrading application.

The physical properties are dictated by the particular use application of the abrasive article. For instance, polyurethane foam backup pads in the abrasive article environment are subjected to high frequency cyclic compression during use. This produces heat within the foam. This heat generation, combined with the poor heat transfer of a foam, can produce a high internal temperature at the site of greatest deformation. Foam back up pads generally must be able to withstand internal temperatures of $\geq 90°$ C. without permanent deformation and retain their shape without distorting or coming apart. Such distortion may induce thermal degradation of the foam with the formation of internal voids, followed by structural failure of the pad. Therefore, high elasticity of the foam pad is required to minimize heat generation due to hysteresis losses during cyclic compression of the foam during use. If excessive internal temperatures are developed during use, the foam can degrade and fail. The foam must also have high tensile strength and tear resistance to resist the stresses placed on the pad during high speed operation of the abrasive article. In addition, the backup pad must have the proper firmness to optimize abrasive performance, and the proper weight to be compatible with the driving tool (i.e., orbital sander counterweight). Also, foam back up pads need to display acceptable performance especially during random orbital usage. Such foam back up pads must have sufficient tensile strength and tear strength to resist failure at rotational speeds as high as 15,000 rpm. The ability of a foam pad to withstand such a rotational force provides an indirect measurement of the tensile strength and tear resistance of the foam. Generally, one important factor in determining the ultimate physical capabilities of polyurethane foam is its foam-forming chemistry.

The basic reaction chemistry for the formation of polyurethane or isocyanate-based resins involves a condensation reaction of isocyanate (NCO) and hydroxy (OH) end-groups. This forms a basic polymeric unit with urethane linkage groups (i.e., $R_aNHC(O)$—$OR_b$), from which the name to this class of materials was derived. Another reaction that plays an important role involves isocyanate (NCO) end-groups and water molecules ($H_2O$) which react to produce carbon dioxide ($CO_2$), which serves as a blowing (foaming) agent for certain cellular products, and amine which further reacts to form disubstituted ureas linkages. In any event, the two major ingredients of polyurethane resin systems are liquid isocyanates as a source of NCO groups and polyols as a source of hydroxyl (OH) groups. Isocyanates used are generally difunctional (diisocyanates). Common examples include toluene (or tolylene) diisocyanate in two isomeric forms (2,4 and 2,6) which is abbreviated "TDI", and methylene di (or bis) phenyl diisocyanate which is abbreviated "MDI", also used in polymeric form ("PMDI"). Polyols, also referred to as "macroglycols", feature hydroxyl groups (OH) as end-group and side-group. The chain length of the polyol and frequency of occurrence of OH groups (functionality) can be varied. In general, flexible polyurethanes are associated with low functionality and long chains, while rigid ones correspond to high functionality and short chains. Polyols are generally divided into two classes: one being polyester types which generally have good resistance to oils and hydrocarbons, and polyether types, which generally have good resistance to hydrolysis (water-associated degradation). Polyurethane-type resins often feature other chemicals that play a role in the complex and varied chemical reactions associated with polyurethane chemistry. Briefly, these chemicals are often called extenders, chain-extending agents (e.g., short chain diols such as 1,4-butane diol), curative agents, cross-linking agents, or even catalysts as they are used in relatively small amounts. Conventional catalysts include, for example, amines such as tertiary amines, tin soaps and organic tin compounds. Nucleating agents, surfactants, and fire-retardants are also often added to foam forming formulations.

Commercially available abrasive article back up pads are known that include TDI/polyester foams and MDI/polyester foams. Traditionally, formulations based on polyester polyols and toluene diisocyanate (TDI) have been used in order to prepare foams for abrasive article back up pads as they were considered to provide a requisite combination of strength and elasticity. These formulations, however, suffer from several major disadvantages. One disadvantage being the high vapor pressure of TDI. As another disadvantage, polyester foam systems also incur high raw material costs, as polyester polyols are often significantly more expensive than other polyols such as polyether polyols. The addition of a prepolymer synthesis step makes this cost differential even greater, that is, a two-part formulation foam system used to form a polyurethane foam body member based on a polyol and toluene diisocyanate (TDI) quasi-prepolymer part and a polyester polyol/catalyst/water part. Another disadvantage is the high viscosity of polyester polyols. This requires the use of low pressure foam machines, which require frequent solvent flushes to remove urethane residues from the mechanical mixing components. Possibly more common are MDI/polyester foam pad formulations.

By way of explanation, conventional foam machines generally come in two varieties. The first type is a "low pressure" machine which relies on a mechanical mixing device in the dispensing head to mix the two component streams. The advantage of this type of machine is its ability to handle a wide range of viscosities and small volumes per foam shot. On the other hand, a major disadvantage is the need to regularly flush the mixing head with solvent to remove curing polyurethane residue from the mixing chamber. The solvent most commonly used for this is methylene chloride, which leads to hazardous waste material requiring costly handling and disposal. A second foam machine type is the "high pressure" or impingement mixing machine. In this type of device, mixing is achieved by impingement of two high velocity component streams within the mixing chamber. Because there is no mechanical mixing fixture to interfere, the chamber can be wiped clean with a piston after every shot, eliminating the need for solvent cleaning. This is currently the preferred type of machine for large, high volume parts such as automotive seating and RIM part manufacture. However, back up pads based on polyester/TDI foams are restricted to usage in low pressure foam machines due to the high viscosity of the polyester foam systems and volatility of TDI even though these machines require troublesome and time-consuming regular cleaning with noxious solvents. A need remains to find a less hazardous class of isocyanates for use in making foam back up pads.

MDI (methylene diphenyl diisocyanate)/polyester polyurethane foams are also known but they have serious drawbacks including solvent waste problems associated with cleaning low-pressure foam machines, as the more viscous polyester system requires resorting to the low pressure machines, and a foam elasticity that is lower than that generally considered acceptable for abrasive back up pad applications. These MDI/polyester foams are generally of lower performance than TDI/polyester foams, but are nonetheless widely utilized.

Other related art is set forth in the following references:

U.S. Pat. No. 4,631,220 (Clifton) pertains to a coated abrasive back up pad comprising a layer of resiliently compressible foam, a rigid fiber reinforced polymeric backing plate, a circular array of openings in the backing plate through which the backing plate is attached by screws to a drive mechanism, and a flexible adhesion layer fixed to an opposite surface of the foam layer. The back up pad includes a metal reinforced plate between the backing plate and the layer of foam.

U.S. Pat. No. 4,893,436 (Rich) describes a back up pad of felted polyurethane foam for use on a vibrating or oscillating sanding device that both efficiently transfers driving forces between the surfaces of the pad to drive a sheet of coated abrasive adhered to its outer surface against a work piece, and restricts chattering and bouncing of the sanding device on the work piece.

As apparent from the above, there remains a need for a back up pad foam affording favorable production safety and waste reduction while meeting backup pad performance requirements associated with the abrasive article environment.

SUMMARY OF THE INVENTION

The present invention provides a foam back up pad for an abrasive article involving a highly resilient yet adequately strong and durable open cell foam that can be manufactured in a high pressure foam machine without creating an undue risk of noxious fumes, and also avoiding the nuisance and cost of solvent cleaning and solvent waste disposal problems otherwise associated with use of a low pressure foam machine.

Briefly and in general terms, one embodiment of the present invention is an abrasive article back up pad comprising a resilient, open cell polyurethane foam formed as the reaction product of a polyether polyol and an aromatic polyisocyanate.

In one preferred embodiment the aromatic polyisocyanate includes methylene diphenyl diisocyanate ("MDI"). The MDI, as a polyurethane-forming starting material or reactant, can be used in monomeric form, modified form, polymeric form, or as a blend among monomeric, modified and/or polymeric MDI, or any of these forms of MDI blended with a different type (non-MDI type) of polyisocyanate. Modified MDI systems include, for example, uretonimines and short chain diol prepolymers. Preferably, the MDI is used in polymeric form. A useful MDI-containing compound as the polyisocyanate reactant of this invention can be represented by Formula (A) below:

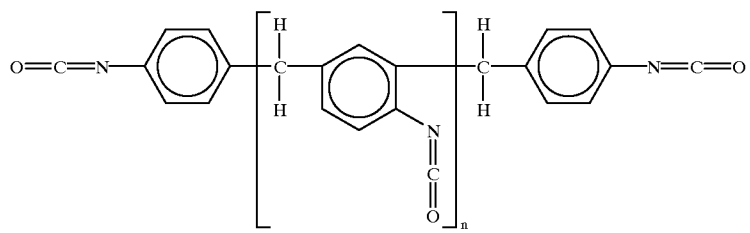

(A)

In Formula (A), n is an integer value of 0 or greater, preferably a nonzero positive integer value of one or more. For example, when n is zero, Formula (A) represents 4,4'-methylene diphenyl diisocyanate (also referred to herein occasionally as 4,4'-diisocyanatodiphenylmethane). Where n is one or more, Formula (A) represents a polymeric MDI. The invention also contemplates MDI-containing compounds including the 2,4' isomer of the compound represented by Formula (A). Although hydrogenated MDI has not been commonly used in foams prior to this invention, the present invention also contemplates that the polyisocyanate component could encompass hydrogenated MDI.

The back up pad of the invention can be designed to be used by hand or in combination with a machine. In one preferred embodiment, the foam pad preferably has a facing means attached to a front surface thereof to facilitate attachment of the foam pad to the backside of an abrasive article. Also, hardware can be provided on the back opposing surface of the foam pad to enable attachment of the back up pad assembly to a drive means for the abrasive article.

The high resiliency polyether/MDI polyurethane back up pad formulations of the invention are so-called cold-molded foams and they offer a superior combination of strength, high elasticity, low cost and rapid cure speed. More specifically, since MDI has a much lower vapor pressure than TDI, the risk of accidental exposure during production is greatly reduced. Polyether polyols also have low enough viscosities that high pressure impingement mixing foam machines can be used, thereby eliminating cleaning solvent usage and the resulting waste stream. The polyether polyol/

MDI foam backup pads provide these advantages in production safety and waste reduction while maintaining backup pad performance requirements. That is, the inventive foam back up pads display high resilience along with good strength and durability. Also, the thermal degradation of the back up pad foam is minimized by using a polyether polyol/MDI foam as in the invention which is highly elastic and has minimal viscous loss properties. As the polyether polyols are also generally less expensive than polyester polyols, it is advantageous from both waste and cost reduction purposes to use the polyether polyol/MDI foam system used in the present invention.

The "abrasive article" backed up by the foam pad of this invention is not particularly limited, although it generally will be a conformable sheet or sheet-like configuration for most applications presently contemplated for this invention and it will have at least one major face thereof presenting an abrasive surface texture. The abrasive articles usable in the invention include coated abrasive articles, structured abrasives, nonwoven abrasives, and slurry coated abrasives. "Coated abrasives" generally comprise a flexible backing upon which a binder holds and supports a coating of abrasive grains. The coated abrasive typically employs a "make" coat precursor of resinous binder material. The make coat secures the abrasive grains to the backing. A "size" coat precursor of resinous binder material is applied over the make coat and abrasive grains. The size coat firmly bonds the abrasive grains to the backing. Additionally, the abrasive grains are generally oriented with their longest dimension perpendicular to the backing to provide an optimum cut rate. "Nonwoven abrasive articles" generally comprise a fibrous mat of fibers which have on at least a portion of their surface an abrasive coating comprising abrasive grains and a binder. The fibers can be formed from various polymers, including polyamides, polyesters, polypropylene, polyethylene, and various copolymers. Naturally occurring fibers such as cotton, wool, bast fibers and various animal hairs may also be suitable. "Slurry coated abrasives" generally involve a flexible backing upon which a coating mixture is attached including abrasive grains dispersed in an adhesive material as a continuous phase. The dispersion of the abrasive particles in the coatable adhesive can be applied in generally uniform thickness to the backing. A "structured abrasive" article involves a plurality of precisely shaped abrasive composites bonded to a backing.

BRIEF DESCRIPTION OF THE DRAWING

The foregoing and other objects, aspects and advantages will be better understood from the following detailed description of the preferred embodiments of the invention with reference to the drawing, in which.

DETAILED DESCRIPTION OF THE PREFERRED EMBODIMENTS OF THE INVENTION

Figure 1:
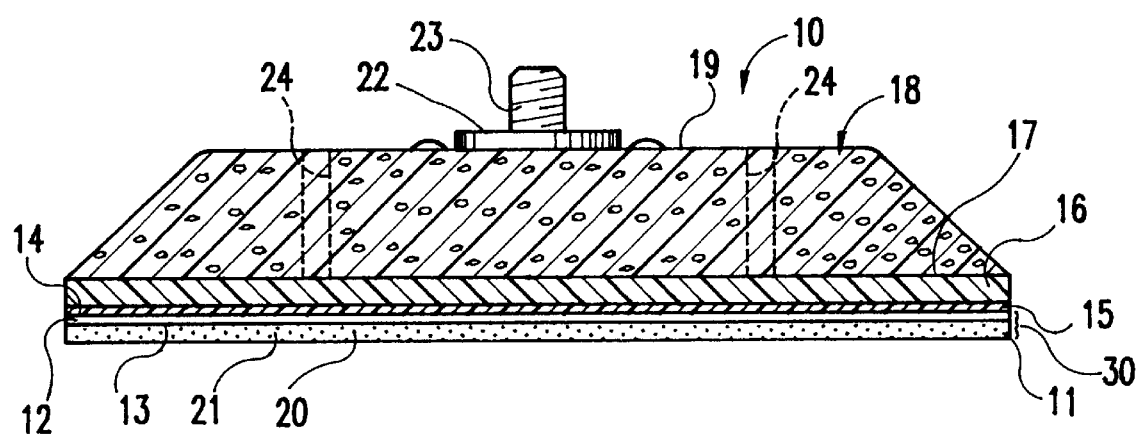
FIG. 1 is an enlarged cross-sectional view of a back up pad of the invention. The depicted thickness and sizes of the various features are for sake of illustration and should not be construed as necessarily reflecting actual scale.

This invention relates to a novel abrasive article back up pad including a high-resilience polyurethane foam layer component based on the reaction product of polyether polyols and an aromatic polyisocyanate, especially an MDI based polyisocyanate. The foam back up pad provides support to an abrasive article during abrading. The abrasive article can be a coated abrasive, a lapping coated abrasive, a structured abrasive or a three dimensional nonwoven abrasive.

FIG. 1 shows a back up pad 10 according to the invention with an abrasive article 30 attached thereto. Abrasive layer 11 of article 30 comprises a plurality of abrasive particles 20 attached to a flexible backing 12 by adhesive coating 21. The backing 12 has a front side 13 and a back side 14. Attachment layer 15 is provided as a pressure sensitive adhesive layer (PSA) to releasably attach the abrasive article 30 (layers 11 and 12) to the facing layer 16 provided on the front surface 17 of molded foam layer 18. Foam layer 18, on its rear surface 19, is attached to a rigid metal backing plate 22. A threaded stud 23 is fixed in a known manner to the back side of the rigid backing plate 22 to allow attachment of the back up pad 10 to a suitable tool or drive means (not shown) capable of, for example, rotatably driving the pad 10 and the article 30 around the longitudinal axis of threaded stud 23. Optional air ducts 24 can be provided to extend through the thickness of the foam layer 18 of the back up pad 10 for ventilation.

The back up pad of the invention can be used in any of a variety of desired abrading applications so long as it is properly designed to meet the requirements of the given abrading application. The foam material and mixing proportions of the components of the foam should be formulated to meet the needs of the desired abrading application. It is to be understood that the term abrading, and its variants, as used herein are meant to include operations used to reduce or refine a workpiece surface through frictional contact between the workpiece surface and an abrasive article, such as grinding, sanding, finishing, cleaning or polishing operations. These abrading applications can vary widely from final polishing of ophthalmic lenses to heavy stock removal of metal parts. These abrading applications can also involve either abrading by hand or abrading with a machine as the mode of driving the abrasive article in motion. The abrading motions may include a linear motion, random motion, rotary motion, oscillation, random orbital motion, combinations thereof or the like. The shape of the foam back up pad may be a square, triangle, rectangle, oval, circle, pentagon, hexagon, octagon, polygon and the like. The diameter for a circular back up pad ranges from about 0.5 to 50 inches (1.25 cm to 127.0 cm), typically 1 to 30 inches (2.5 cm to 76.2 cm). The length and/or width of the back up pad can range from about 0.05 to 50 inches (0.13 cm to 127.0 cm), typically 1 to 30 inches (2.5 cm to 76.2 cm). In some instances, a coated abrasive article will overhang the back up pad by a very slight amount, i.e., typically less than 0.1 inches (0.25 cm), preferably less than 0.05 inches (0.13 cm). The thickness of the foam body member generally will range from between about 0.2 cm to 7.0 cm typically 0.5 cm to 5.0 cm, and preferably between 1.0 cm. to 3.0 cm.

The foam back up layer, as used in most abrading applications, will be molded to present a pair of substantially parallel spaced major surfaces or faces. Referring to the Figure, the front face 17 of the foam back up pad 10 provides a surface upon which a pad facing layer 16 can be provided. Examples of materials useful for forming the front facing layer include cloth, nonwoven substrates, treated cloth, treated nonwoven substrates, polymeric films and the like. Examples of preferred front facing materials include loop fabric, cloth sheeting, vinyl sheeting, hooks, nylon coated cloths, vinyl coated nonwovens, vinyl coated cloth, hook faced materials, and the like. The loop fabric can be a knitted loop, brushed loop, a chenille stitched loop, and the like. The polyurethane material of the foam layer 18 is bonded to the pad facing layer 16 and can be hardened in-situ on the pad facing. For instance, a polyurethane material can be foamed directly to the back side of a pad facing such as loop fabric, thereby adhering to the pad facing. Alternatively, the front facing material can be adhesively bonded to the polyurethane foam. If the polyurethane is foamed onto the front facing material, the front facing material preferably is first sealed to prevent undesired excessive penetration of the foam therethrough.

If the foam back up pad is intended to be used in machine driven applications, it will typically have some type of mechanical attachment system opposite the side of the loop fabric to secure the back up pad to the machine. One such system comprises rigid backing plate 22 fixed to the rear surface 19 of the foam back up pad 10 with threaded stud 23 fixed to the plate 22 (e.g., by welding) for attachment of the foam pad 10 to a drive motor, such as described in U.S. Pat. No. 4,844,967 (Goralski), incorporated herein by reference. Backing plate 22 is affixed (e.g., by rivets) to a larger diameter fiberglass plate (not shown) or an equivalent member and the foam surface 19 is bonded directly to the fiberglass to thereby affix the mounting system to the back up pad 10. Any of a variety of systems or means can be provided for detachable coupling of the foam pad 10 to different types of drive motor assemblies. Such means are known in the art and may include, for example, central concentric openings extending through the foam and the backing plate and accommodating the threaded end of a headed bolt, with the bolt head abutting the surface of the backing plate affixed to the foam with the haed of the bolt positioned in the central opening of the foam and the threaded end of the bolt engaging the drive member of a drive motor assembly. For random orbital applications, the support member may contain a threaded studed or other attachment system for mounting onto the machine. Other means that can be provided to adapt the back up pad for operation with drive mechanisms include those disclosed in U.S. Pat. No. 4,631,220 (Clifton), incorporated herein by reference. It will be understood that the invention is not limited by the specific mounting system employed, and those skilled in the art will appreciate that the specific mounting system employed for use with a specific back up pad will depend on the type of tool to be used with the pad.

For manual abrasive operations held in the hand, various shapes or configurations of foam back up pads may be utilized. Two such types include hand pads and foamed back up pads used on long planing boards. The strength and other physical properties required for these manual abrasive operations is less than those for random orbital applications where the strength and physical property requirements of the foam become much more significant. The physical properties of the foam depend on the end use application. As the back up pad is used in abrading applications, there can be a manual grip handle associated with it.

In some instances, it is preferred to incorporate a pressure sensitive adhesive onto the back side of the abrasive article so that the backing of the abrasive article can be secured to the facing layer of the foam back up pad. Representative examples of pressure sensitive adhesives suitable for this invention include latex crepe, rosin, acrylic polymers and copolymers e.g., polybutylacrylate, polyacrylate ester, polyvinyl ethers, e.g. polyvinyl n-butyl ether, alkyd adhesives, rubber adhesives, e.g., natural rubber, synthetic rubber, chlorinated rubber, and mixtures thereof. The preferred pressure sensitive adhesive is an isooctylacrylate: acrylic acid copolymer.

Alternatively, a hook and loop type attachment system may be employed to secure the abrasive article to the facing of the foam back up pad. The hook fabric may be on the back side of the abrasive article with hooks on the front side of the back up pad. Otherwise, the hooks may be on the back side of the abrasive article with the loops on the front side of the back up pad. This hook and loop type attachment system is further described in U.S. Pat. Nos. 4,609,581 and 5,254,194 and U.S. patent application Ser. Nos. 08/181,192; 08/181, 193 and 08/181,195, each of which is incorporated herein by reference. The opposite exposed front side of the abrasive article has an abrasive coating that is responsible for the abrading action.

The abrasive article, the means for the attachment of the article to the back up pad, the foam facing layer, the rigid backing plate and threaded stud, as mentioned above in connection with the discussion of FIG. 1, while useful and necessary from a practical standpoint to the present invention, can be supplied by known means and constructions in the field and thus should not need further details provided herein to be understood by one of skill.

It is the resilient polyurethane foam or "body member" that provides the desired properties of strength, rigidity, life, flexibility and the like for use of the aforementioned abrasive article and these properties are dependent upon the intended abrading application.

The polyurethane foam formulations used in the foam pad layer in this invention are based on the primary reactants of polyether polyols, aromatic polyisocyanates, and water. The polyol segments of the polymer network are known as the "soft" segments, and the isocyanate segments are the "hard" segments of the polyurethane. The water reacts with an aromatic polyisocyanate forming an unstable carbamic acid which rapidly reacts with another isocyanate forming a urea hard segment.

Polyether polyols may be broadly grouped into the following categories: polyoxypropylene diols, polyoxypropylene triols, polyoxypropylene tetrols, and ethylene-oxide-capped diols, triols or tetrols. Examples of polyether polyols include polypropylene glycol, polyether triols, polypropylene ether glycol (PPEG), polyethylene ether glycol (PEEG), polytetramethylene (or butylene) ether glycol (PTMG or PBEG). There also are random and block polymers of the above polyether polyols in which the polyol is made with both ethylene and propylene oxides. When the oxides are fed as a mixed feed, the products are termed hetero-polyols. Graft or copolymer polyols contain stable dispersions of a solid particulate polymeric phase in the liquid polyol phase.

The polyether polyols useful in this invention are preferably polyether triols, and more preferably polypropylene glycol polyether triols with molecular weights (weight average) of approximately 6000. In referring to the molecular weights of the polyether polyols herein, such molecular weights shall be understood to be weight average molecular weights. In one preferred embodiment, the polyether polyols are prepared from approximately 6000 molecular weight polypropylene oxide triols which have been partially end capped with ethylene oxide. The resulting primary hydroxyl content gives an enhanced cure speed. These polyols may optionally contain polymer graft polyols, for example where styrene/acrylonitrile polymer has been grafted to the polyol as a means of increasing the foam hardness and increasing load bearing characteristics without substantially changing the foam density. Flexible polyurethane foams of this invention generally require polyols with an equivalent weight of between 500 and 2000.

Preferably the polyether polyols contains two or more primary or secondary aliphatic hydroxyl groups (i.e., the hydroxyl group is bonded directly to a nonaromatic carbon atom). The hydroxyl group may be terminally situated, or may be pendent from a polymer or copolymer.

Examples of suitable polyether polyols include those available under the trade designations, e.g, ARCOL 11–27, a 6,000 molecular weight ethylene oxide end capped polypropylene glycol polyether triol; ARCOL 34–28, a polymer polyol having styrene/acrylonitrile polymer grafted to ethylene oxide end capped polypropylene glycol polyether triol; and ARCOL 31–28, a polymer polyol having styrene/acrylonitrile polymer grafted to ethylene oxide end capped polypropylene glycol polyether triol; all commercially available from Arco Chemical Co., Newton Square, Pa.

The aromatic polyisocyanate component of the foam forming formulation generally can be either MDI monomers, modified MDI, MDI polymers, TDI, or blends of these. The reactions that produce MDI are usually optimized to produce the two-ring MDI isomers. The two-ring isomers are solids at room temperature, but can be liquefied by including carbodiimide structures. Because they are relatively free of steric hindrance, the 4,4'-MDI and 2,4'-MDI isomers generally are too reactive for use in most flexible-foam formulations. In addition, high cost and solids-handling problems associated with pure MDI renders their use in the flexible foams used in the present invention difficult and less preferred.

Instead, polymeric MDIs or blends of polymeric MDIs with the pure isomers are more useful in the flexible foam formulations of this invention. Many polymeric MDI products are available, differentiated by viscosity, functionality and reactivity. Polymeric MDI offers a lower vapor pressure than TDI, a potential safety consideration. Preferably, the MDI is used in polymeric form. An MDI-containing compound useful as the polyisocyanate reactant of this invention can be represented by Formula (A) below:

Although less favored, it is also within the scope of the invention to use TDI isomers, such as 2,4-TDI or 2,6-TDI, either alone or in combination with the MDI polyisocyanates described above. Depending on the exact reaction and purification scheme that is used, the ratio of 2,4-TDI isomer to 2,6-TDI isomer in the final product can be 65/35, 80/20 or 100/0, respectively. The TDI isomer ratio can dramatically affect the properties of the polymer and the resulting foam. The 80/20 TDI isomer blend is generally preferred for flexible foam. However, the 65/35 TDI isomer blend may be useful for balancing the reactivity in specialized formulations and it also produces flexible foams with higher load-bearing characteristics.

Other commercially available polyisocyanates that can be used in combination with the above MDI or TDI include, for example, hexamethylene diisocyanate, isophorone diisocyanate, 3,5,5-trimethyl-1-isocyanato-3-isocyanatomethyl-3-cyclo-hexane, 4,4',4"-triisocyanatotriphenylmethane, and the polymethylenepolyphenylisocyanates. Other polyisocyanates are known and include those described in U.S. Pat. Nos. 3,700,643 and 3,600,359.

The preferred mixing ratio for the polyol, water, and polyisocyanate components in the polyurethane foam formulations of this invention will provide an isocyanate index ("NCO index") value from 90 to 110; the NCO index is calculated as the ratio of the NCO equivalents present divided by the sum of the polyol and water equivalents present in the foam forming formulation, with the resulting quotient multiplied by 100. A more preferred isocyanate index for this invention is 100. As understood in the field of polyurethane chemistry, variation of the isocyanate index in a foam has a pronounced effect on the hardness of the final (A)

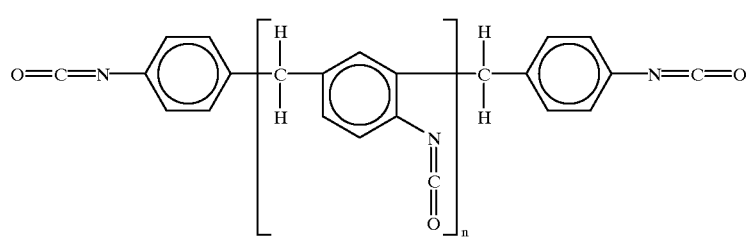

In Formula (A), n is an integer value of 0 or greater, preferably a nonzero positive integer value of one or more. For example, when n is zero, Formula (A) represents 4,4'-methylene diphenyl diisocyanate (i.e., 4,4'-diisocyanato-diphenylmethane). Where n is one or more, Formula (A) represents a polymeric MDI. The invention also contemplates MDI-containing compounds including the 2,4'isomer of the compound represented by Formula (A). Although hydrogenated MDI has not been commonly used in foams prior to this invention, the present invention also contemplates that the polyisocyanate component could encompass hydrogenated MDI. Polyisocyanate mixtures containing MDI can also be used such as the mixture of MDI and trimer of MDI available from Dow Chemical Company, Midland Mich. under the trade designation ISONATE 143L "Liquid MDI". One preferred aromatic isocyanate useful in the foam formulations of this invention is available under the trade designation MONDUR CD, which is a modified MDI, manufactured by Bayer, Pittsburgh Pa. It is expected that other MDI oligomers will work as well.

foam. This increase in hardness is understood to be directly related to increased equivalent cross-linking.

To make a foam, the polyurethane polymer must be expanded or blown by the introduction of bubbles of a gas. A convenient source of gas is the carbon dioxide produced from the reaction of an isocyanate with water. The foams of the invention are preferably water blown, and no additional blowing agents need be added. However, it is within the scope of this invention to add blowing agents other than or in addition to water, such as trifluoromethane or a similar volatile material, if desired. Foam density may be varied as desired by changing the amount of water incorporated. Generally, the foam density needed for the abrasive article back up pad application is in the range of 32 to 800 kg/m$^3$.

Diethanolamine or any of a variety of lower molecular weight polyfunctional components can be used as a crosslinker to stabilize the foam during expansion by giving a rapid viscosity build. The catalyst combination is chosen to provide an optimal gel/blow ratio with minimal shrinkage or foam collapse. In general, the crosslinker concentration in pph based on polyol is 0–5.0%; more preferably 1–5%. Cross-linkers which are typically short-chain polyfunctional molecules added to increase load bearing or initial foam stability. These can be polyols or amine polyols. Representative examples of suitable organic materials have a hydroxyl functionality of 1 and include alkanols, monoalkyl ethers of polyoxyalkylene glycols, and monoalkyl ethers of alkylene glycols. Examples of useful cross-linkers include diethanolamine, such as that commercially available from Aldrich Chemical Co., Milwaukee, Wis.. Other useful cross-linkers include those avalailable under various trade designations, as follows: UNILINK 4200, an aromatic secondary diamine commercially available from UOP, Des Plaines, Ill.; QUADROL, a polyol commercially available from BASF, Mount Olive, N.J.; VORANOL 446: a polyol commercially available from Dow Chemical, Midland, Mich.; and VORANOL 800: a polyol commercially available from Dow Chemical, Midland, Mich.

Representative examples of useful chain extenders include monomeric polyhydroxy organic materials include alkylene glycols (e.g., 1,2-ethanediol, 1,3-propanediol, 1,4-butanediol, 2-ethyl-1,6-hexanediol, 1,4 cyclohexane dimethanol, 1,18-dihydroxyoctadecane, and 3-chloro 1,2-propanediol), polyhydroxyalkanes (e.g., glycerine, trimethylolethane, pentaerythritol, and sorbitol) and other polyhydroxy compounds such as N,N-bis(hydroxyethyl) benzamide, 2-butene-1,4-diol, castor oil, and the like.

A silicone/polyether surfactant can be used to provide foam stabilization and assist in cell opening. Almost all flexible polyurethane foams utilize nonionic, silicone-based surfactants to reduce the bulk surface tension, emulsify incompatible formulation ingredients, promote the nucleation of bubbles, reduce stress concentration in the thinning cell walls to stabilize the rising foam and counteract the defoaming effect of any solids in the foam. An example of a useful surfactant is that available under the trade designation NIAX L-3001, a silicone surfactant commercially available from OSi Specialties, Inc., Danbury, Conn.

In each foam formulation, a minimum level of surfactant is needed to produce commercially acceptable foam. If no surfactant is present, the bubbles will rapidly coalesce and rise to the surface in a pattern known as boiling. If surfactant is present, but the level is inadequate, foams may be stable, but imperfect. At optimum surfactant levels, stable, open-cell foams are produced. If surfactant levels are too high, the froth actually can become too stable, resulting in tighter, closed-cell foams with poorer physical properties. In general, the surfactant concentration in pph based on polyol is 0–2.0%; more preferably 0.5–1.5%.

The polyurethane formulations preferably incorporate one or more catalysts. Chemicals such as certain organometallic compounds, viz. organic tin compounds (e.g., dibutyltin dilaurate) or tertiary amines are often involved in the recipes as true catalysts for the reactions. Combinations of catalysts may be used to balance the polymer-formation rate (isocyanate with hydroxyl) with the gas-formation rate (isocyanate with water). Care must be taken that the reaction rates are balanced as, in the event of an imbalance, the gelling polymer may not have sufficient strength to trap the carbon dioxide within the expanding cell walls. Further, depending on the imbalance and when it occurs, the result could be catastrophic cell collapse, open cells or splitting; and excessive shrinkage may also occur.

Catalysts also ensure that the polymerization reaction goes nearly to completion and, in the case of molded foams, accelerate the rate of cure so that the foams can be removed from the mold earlier and handled more quickly. If the catalyst level is too high, the cream time of the dispensed foam may be too short. As used herein, cream time refers to the time between the discharge of the foam materials from the mixing head and the beginning of the foam rise, typically indicated by a color change in the surface of the liquid as a result of the saturation of the liquid with evolving gas. If the cream time is less than 2 seconds, dispensing problems may result.

Examples of useful catalysts are DABCO 33-LV, a 33% triethylene diamine in dipropylene glycol commercially available from Air Products and Chemicals Inc., Allentown, Pa.; DABCO BL-16, a 10% bis(N,N dimethylaminoethyl) ether in dipropylene glycol commercially available from Air Products and Chemicals Inc., Allentown, Pa.; and NIAX A-300, a commercially available from OSi Specialties, Inc., Danbury, Conn.

A more recent development in the field is the emergence of delayed-action catalysts. These catalysts are not very active at room temperature, but activate as the initial reaction exotherm warms up the foaming polymer mass. Typically, a tertiary amine salt in a suitable solvent is used such as a low-molecular- weight glycol, for example. Tertiary amine salts of organic acids such as carbonic, formic, acetic, 2-ethylhexanoic, and lactic acid can be used as such delayed catalysts in the present invention.

In general, the catalyst concentration in pph based on polyol is 0–5.0; more preferably 0.5–2.0; most preferably 0.5–1.0. Those skilled in the art will appreciate that the catalyst concentration depends on catalyst activity and type. There are also other polyurethane catalysts known in the art, and empirical optimization could reveal other useful combinations to one of skill. The exact composition will be selected to tailor the foam for a given application and to allow its processing in commercial plants that can differ widely in capabilities.

An antioxidant can be included in the foam-forming formulation to improve the heat stability of the foam and can also reduce internal scorching of the foam. During use as a foam back up pad, the heat generated can cause degradation of the foam. It is therefore desirable to incorporate antioxidants such as IRGANOX 1076, an antioxidant commercially available from Ciba Geigy Corp., Hawthorne, N.Y.

The foam of the invention may further contain other additives as long as these additives do not interfere with or adversely affect the physical properties of the foam. Examples of such additives include dyes, pigments, UV absorbers, UV stabilizers, plasticizers, processing aids, fillers, fibers, reinforcing fibers and the like.

Choices and effects of various adjuvants and manners of making the foam of this invention are generally described in "Flexible Polyurethane Foams", Editors: R. Herrington and K. Hock, Dow Chemical Co., 1991, which is incorporated herein by reference.

It is within the scope of this invention to use the foam formulation with either a high pressure foam machine or low pressure foam machine without limitation in that regard.

The foams of this invention also can optionally contain a reinforcing substrate such as a scrim, woven cloth, nonwoven, reinforcing strands, knitted cloth, and the like. These reinforcing materials generally are applied first to the mold and then the foam-forming formulation is introduced into the mold so as to engulf the reinforcing substrate.

The foams of this invention have relatively high tensile strengths, and very high elasticity for polyether foams. Due to their high primary hydroxyl content, they cure rapidly and can be removed from the mold often after only a few minutes.

The invention is further described with reference to the nonlimiting Examples set forth below. Unless indicated otherwise, all parts, amounts, percentages, and the like, are by weight.

EXAMPLES

EXPERIMENTAL TEST PROCEDURES:

The following tests were used to analyze the products made by the examples described below.

TEST PROCEDURE I

This was an accelerated use test designed to measure a back up pad's reaction to continuous heavy use. Foams having insufficient elasticity generate considerable internal heat during this test resulting in scorching and degradation, foam set, void formation and pad failure. This test consisted of a bare pad (without an abrasive article affixed thereto) connected to a hydraulic motor running at 3500 rpm. All pads tested were disc shaped with a front face having a diameter of 6 inches (15.2 cm) with a pad thickness of about 0.625 inch (1.6 cm). The front facing of the pad was tilted 20 degrees from horizontal, and the edge of the pad face was placed in contact with the surface and near the periphery of a freely rotating aluminum table so that the edge of the pad spun the table under the power of the aforementioned motor. A downward force of 18 pounds was exerted by the weight of the motor assembly on the edge of the pad in contact with the table, and the pad was rotated continuously by the motor for one hour. The pad was then inspected for damage. Pads which exhibited observable distortion of their original shape were cut open to determine the extent of abrasive scorching, if any. The inventive foam formulations passed this test, exhibiting no scorch or void formation with only a slight set at the pad edge. All of the inventive pads were evaluated as suitable for further use even after being tested.

TEST PROCEDURE II

This was a rotational failure test used to test the pad formulations which passed the accelerated use test of Test Procedure I. Each bare foam pad (without an abrasive article attached thereto) was mounted in a sealed chamber and spun in a free spin mode at a ramp rate increasing 500 rpm per second. The rotational speed at which the pad failed, as well as the failure mode were noted. This test measured the strength and tear resistance of the foam.

TEST PROCEDURE III

Shore A hardness was measured by ASTM Procedure D 2240-91 involving placing the foam specimen on a hard, horizontal surface. The durometer (A) was held in a vertical position with the point of the indentor at least 12 mm from any edge of the specimen. The presser foot was applied to the specimen as rapidly as possible, without shock, keeping the foot parallel to the surface of the specimen using just sufficient pressure to obtain contact between the presser foot and the specimen. After the presser foot was in firm contact with the specimen, the scale reading was taken (read) within one second or the maximum reading was taken(recorded). Five hardness measurements at different positions on the specimen at least 6 mm apart were taken and the arithmetic mean determined.

TEST PROCEDURE IV

After full, adequate cure, the weight of the foam back up pad was measured in grams. Pad weight must be compatible with the drive mechanism to provide proper balance and to minimize vibrations.

MATERIALS DESCRIPTION

POLYOLS

ARCOL 11–27: 6,000 molecular weight ethylene oxide end capped polypropylene glycol polyether triol commercially available from Arco Chemical Co., Newton Square, Pa.

ARCOL 34–28: a polymer polyol having styrene/acrylonitrile polymer grafted to ethylene oxide end capped polypropylene glycol polyether triol commercially available from Arco Chemical Co., Newton Square, Pa.

ARCOL 31–28: a polymer polyol having styrene/acrylonitrile polymer grafted to ethylene oxide end capped polypropylene glycol polyether triol commercially available from Arco Chemical Co., Newton Square, Pa.

CROSSLINKERS

Diethanol amine: commercially available from Aldrich Chemical Co., Milwaukee, Wis..

UNILINK 4200: an aromatic secondary diamine commercially available from UOP, Des Plaines, Ill..

QUADROL: a polyol commercially available from BASF, Mount Olive, N.J.

VORANOL 390: a polyether polyol commercial available from Dow Chemical, Midland, Mich.

VORANOL 446: a polyol commercially available from Dow Chemical, Midland, Mich.

VORANOL 800: a polyol commercially available from Dow Chemical, Midland, Mich.

POLYISOCYANATE

MONDUR CD: an aromatic MDI-type polyisocyanate commercially available from Bayer, Pittsburgh, Pa.

CATALYSTS

DABCO 33-LV: 33% diethylene triamine in dipropylene glycol commercially available from Air Products and Chemicals Inc., Allentown, Pa.

DABCO BL-16: 10% bis(N,N'- dimethylaminoethyl) ether in dipropylene glycol commercially available from Air Products and Chemicals Inc., Allentown, Pa.

NIAX A-300: delayed action catalyst commercially available from OSi Specialties, Inc., Danbury, Conn.

SURFACTANT

NIAX L-3001: silicone surfactant commercially available from OSi Specialties, Inc., Danbury, Conn.

NIAX L-3002: silicone surfactant commercially available from OSi Specialties, Inc., Danbury, Conn.

ANTIOXIDANT

IRGANOX 1076: an antioxidant commercially available from Ciba Geigy Corp., Hawthorne, N.Y.

General Procedure for Making Abrasive Back Up Pad Foams

The foams were prepared by mixing all of the components except isocyanate in a paper cup with a high speed mixing blade. The isocyanate was then added and mixing was continued for approximately 5 seconds. The foaming mixture was immediately poured into a room temperature mold containing the pad hardware. A pad facing was placed on top, and the mold cavity was sealed. The mold assembly was placed in a 65° C. (150° F.) oven for 30 minutes to cure the foam. The cured pads were removed from the mold and trimmed of flash. The pads were allowed to cure for 24 hours before testing. The foam formulations are described in the examples below.

Isocyanate Index

The amount of isocyanate required to react with the polyol, water, and any other reactive additives is evaluated in terms of stoichiometric equivalents. This theoretically stoichiometric amount of isocyanate may then be adjusted upwards or downwards, depending on the foam system and the required final properties. The amount of isocyanate used relative to the theoretical equivalent amount is known as the Isocyanate Index:

Isocyanate Index=100 (actual amount of isocyanate used)/theoretical amount of isocyanate required.

EXAMPLES 1–4

A set of experiments was conducted to investigate the effect of polymer polyols on the durability of foam backup pad formulations. For Example 1, a baseline formulation, viz., Foam 1, was prepared. ARCOL 11–27 was used which was a polypropylene oxide triol capped with ethylene oxide having a molecular weight of 6,000. The polyisocyanate was a modified MDI with a functionality of 2.3 and was added to the foam-forming formulation in stoichiometric amount, i.e., an NCO- index value of 100 was provided. Both catalysts were amines used in a ratio that gave the proper balance of gel and blow reactions. Water level was determined experimentally and adjusted to give the proper pad weight and mold fill. A backup pad was prepared using a formulation based on 40 grams of polyol and cured for 30 minutes at 65° C. The resulting foam pad performed well on the accelerated use test(Test Procedure I), with no voids or catastrophic failure. There was a set formed in the pad face, combined with a bulge in the pad edge. When the pad was cut open, a brown scorch ring was seen at the pad perimeter where foam compression was greatest. Internal heat generated during use in Test Procedure I was therefore sufficient to cause foam degradation.

For Examples 2–4, a series of formulations, i.e., Foams 2–4, were prepared using the Foam 1 formulation as a base formulation. The polyol component was modified with various ethylene oxide (EO) capped polymer triols at levels between 20 and 50 percent. Isocyanate level was adjusted to maintain 100 index. The polyols investigated were ARCOL 31–28, which had a high acrylonitrile content, and ARCOL 34–28 which had a higher styrene content. The effect of both additives was to produce a much firmer pad; up to 35 Shore A as determined by Test Procedure III. Pad weights were measured according to Test Procedure IV. There was no change in performance observed for Foams 2–4 in the accelerated use test (Test Procedure I) as compared to Foam 1. In the desired hardness range, pad distortion and scorching was similar to that of the control pad of Foam 1. This indicated that although polymer polyol addition may offer a method to improve pad firmness, it does little to improve pad elasticity. All amounts listed in Table 1 are in parts by weight.

TABLE 1

| Component | Foam 1 | Foam 2 | Foam 3 | Foam 4 |
| --- | --- | --- | --- | --- |
| ARCOL 11-27 | 100 | 60 | 50 | 80 |
| ARCOL 34-28 | — | — | — | 20 |
| ARCOL 31-28 | — | 40 | 50 | — |
| Water | 2.25 | 2.25 | 2.25 | 2.25 |
| Diethanolamine | 1.0 | 1.0 | 1.0 | 1.0 |
| DABCO 33-LV | 0.30 | 0.30 | 0.30 | 0.30 |
| DABCO BL-16 | 0.10 | 0.10 | 0.10 | 0.10 |
| NIAX L-3001 | 1.0 | 1.0 | 1.0 | 1.0 |

TABLE 1-continued

| Component | Foam 1 | Foam 2 | Foam 3 | Foam 4 |
| --- | --- | --- | --- | --- |
| MONDUR CD | 46.75 | 46.8 | 46.8 | 46.7 |
| Isocyanate Index | 100 | 100 | 100 | 100 |
| Shore A Hardness | 25 | 30 | 38 | 27 |
| Pad Weights (g) | 126 | 128 | 130 | 130 |

It was shown that pads having a variety of hardness values, at fairly constant pad weight, can be obtained through the incorporation of polymer polyols.

By comparison to commercially available polyether/MDI and polyester/MDI foams, a typical failure mode in Test Procedure I observed for such pads, which were observed to have insufficient elasticity, was the formation of voids and splits just inside the rim of the pad at the point of maximum deformation. By contrast, no such behavior was observed with the foam formulations of Foams 1–4 described above. In these formulations of Foam 1–4, an area of foam discoloration, and a slight angular set in the perimeter of the pad face were all that was observed. As would be expected, the degree of this behavior was greater in the softer pads which undergo the greatest deformation during testing.

EXAMPLE 5

Pads were prepared with the same formulation as Foam 1 of Example 1, except that separate foam samples were prepared at isocyanate index values of 90, 100, and 110 to investigate the effect of varying the isocyanate index. The major effect once again was to change pad firmness. The only effect seen in accelerated use testing (i.e., Test Procedure I) appeared to be due to pad firmness, with the soft foam pads formed with the NCO-index of 90 performing the worst of the samples compared.

EXAMPLE 6

Since internal foam scorch due to heat buildup appeared to be a major source of foam pad failure in Foam 1 of Examples 1 and 5, experiments were conducted to determine the effect of adding an antioxidant to the foam-forming formulation. A sample of IRGANOX 1076 was obtained for testing. This is a long chain alkyl derivative of BHT (butylated hydroxy toluene) and is soluble in the polyol formulation. Samples having the same formulation as Foam 1 of Example 1, were prepared except that they further contained IRGANOX 1076 antioxidant at 1 pph polyol. Accelerated use testing according to Test Procedure I showed a complete elimination in scorch and a considerable improvement in pad distortion. This effect was shown to extend to a variety of formulations containing polymer polyols.

EXAMPLE 7

The effect of crosslinkers was investigated first by varying the level of diethanolamine, and then by studying the affect of additional use of various crosslinkers added to the Foam 1 formulation of Example 1. The effects observed by using various types of crosslinkers in the Foam 1 formulation is summarized as follows:

TABLE 2

| Crosslinker | Level (pph) | Hardness (Shore A) | Remarks |
|---|---|---|---|
| diethanolamine | 1.0 | 25 | control formulation |
| diethanolamine | 0.5 | 17 | increased distortion, skin delamination |
| UNILINK 4200 | 5.0 | 26 | no oxidation, less scorch, more distortion |
| QUADROL | 1.5 | 28 | similar to control |
| QUADROL | 2.0 | 28 | plate edge delamination |
| QUADROL | 3.0 | 38 | too stiff, plate edge delamination |
| VORANOL 390 | 2.0 | 24 | slight scorch, increased distortion |
| VORANOL 390 | 3.0 | 25 | better than control |
| VORANOL 390 | 4.0 | 35 | similar to control, too stiff |
| VORANOL 446 | 3.0 | 23 | similar to control |
| VORANOL 800 | 3.0 | 32 | slight scorch, plate edge delamination |

In use of the VORANOL and QUADROL materials, which are polyol crosslinkers, it was determined that they required a catalyst change to improve gel rate. That is, these systems also included DABCO 33-LV catalyst at 0.75 pph polyol, with no separate blow catalyst added.

Supplemental to the observations made in Table 2, it was observed that if the crosslinker was left out entirely, the cure speed of those foams was greatly reduced and the foam became unstable during cure and had a tendency to collapse. This tendency was observed to be partially overcome by increasing the level of gel catalyst, but cure speed and pad durability were still reduced. Reducing diethanolamine levels to 0.5 parts gave a very soft pad of 17 Shore A, but with no improvement in performance. The foam formulation including 3 pph VORANOL 390 crosslinker gave the best result as compared to the control formulation duplicating foam 1 of Example 1.

EXAMPLE 8

To investigate the affects of adding a silicone surfactant to the foam, a variety of silicone surfactants were obtained from OSi Specialties, Inc., Danbury Conn., each obtained under the NIAX prefix series sold by that company, and from Goldschmidt Chemicals, each obtained under the "B prefix" series sold by that company. Free rise foam samples were prepared by adding 0.5 (parts by wt.) of each tested surfactant to a foam-forming formulation having the Foam A formulation described in Table 3. All amounts listed in Table 3 are in parts by weight.

TABLE 3

FOAM A[1]

| | Component | Amount |
|---|---|---|
| Part A | ARCOL 11-27 | 100 |
| | Water | 2.25 |
| | DABCO 33-LV | 0.75 |
| | VORANOL 390 | 3.0 |
| | Surfactant | 0.5 |
| | IRGANOX 1076 | 1.0 |
| Part B | MONDUR CD | 49.8 |

[1]Isocyante Index: 100; Shore A Hardness 25; Pad weight: 125.5 g

The surfactant component listed in Table 3 was selected from among the following surfactants listed in Table 4 for each test run and the resulting foam is described.

TABLE 4

| Surfactant | Result |
|---|---|
| none | Very coarse, poor skin, poor cell control |
| NIAX L-3001 | A few large cells, softer, better skin |
| NIAX L-3002 | Similar to Niax L-3001 result, slightly better cell control |
| B-8301 | worse than no surfactant run, cell collapse at wall |
| B-8694 | Similar to Niax L-3001 result, loose thin skin |
| B-4690 | Similar to B-8694 result |
| B-4113 | Similar to B-8694 result |
| B-8300 | Good cell control, smaller cells, softer |
| B-8680 | Very good cell control, small cells very soft |
| B-8681 | Similar to B-8680 result |

Unexpectedly, the surfactants which yielded the best foam results were ones (e.g., B-8680, B-8681) suggested by the respective surfactant manufacturer for use in TDI foams (not polyether foams), and even one recommended by the respective manufacturer for polyester foams (viz., B-8300). Foams including these surfactants appeared to give the finest cell structure, best cell size control, and the softest feeling foams. Foam pads made using each of NIAX L-3001, B-8300 and B-8681 silicone surfactants were subjected to accelerated use testing by the protocol of Test Procedure I. The pads made with the NIAX L-3001 containing foam formulation performed the best. The foams made with B-8300 and B-8681 had better cell control ability, but the foams produced had comparatively lower elasticity. High elasticity foams, such as those containing the NIAX L-3001 silicone surfactant tested in this example, are especially favorable for use in abrading environments.

EXAMPLE 9

An experimental study was carried out to determine the affects of using a delayed action type of catalyst in the formulation of Foam B described in Table 5. All amounts listed in Table 5 are in parts by weight.

TABLE 5

FOAM B[1]

| | Component | Amount |
|---|---|---|
| Part A | ARCOL 11-27 | 100 |
| | Water | 1.95 |
| | VORANOL 390 | 3.0 |
| | NIAX L-3001 | 1.0 |
| | NIAX A-300[2] | 0.75 |
| | IRGANOX 1076 | 1.0 |
| Part B | MONDUR CD | 45.5 |

[1]Isocyanate Index: 100; Shore A Hardness: 22; Pad Weight (g.) 125.5.
[2]Contains 40% (wt.) water.

The added delayed action gel catalyst used, viz. NIAX A-300, was a blocked amine that deblocks on heating and is marketed as an aid to cell opening. The NIAX A-300 was used at 0.75 pph polyol. This foam formulation gave a definite improvement in ease of mixing and mold filling since the onset of foaming was retarded. The foam pads produced were very uniform, with a thick, tough skin and high apparent elasticity. When the pads were run on the accelerated use tester according to the protocol of Test Procedure I, their performance was outstanding. The only visible change in the pad was a very small set in the edge of the pad face and a slight wrinkling of the pad edge. A second set of pads was prepared which had the same formulation, but were cured at 99° C. rather than the standard 65° C. This gave improved performance. Pads made with this formulation achieved performance comparable to the polyester/TDI pads having hardness levels of 22–25 Shore A, which is near optimum. Two pads made according to the foam formulation of this example were submitted for rotational failure testing according to the protocol of Test Procedure II. A failure speed of 18,000 rpm is required for a 10,000 rpm rating. The levels reached were 16,645 and 15,150 rpm. The failure mode was loss of a foam chunk from the pad edge. This contrasts with the typical failure mode which is failure of the facing and complete pad blowup. This suggests either defects such as large bubbles in the foam, which may disappear when a foam machine is used, or a need to increase the tensile strength of the foam slightly. Attempts to improve foam strength by addition of 20% polymer polyol resulted in a pad with poorer accelerated use performance under Test Procedure I.

While the invention has been described in terms of its preferred embodiments, those skilled in the art will recognize that the invention can be practiced with modification within the spirit and scope of the appended claims.

What is claimed is:

1. A back up pad suitable for use with an abrasive article, comprising:
   an abrasive article comprising a flexible backing layer having a front side and a back side, and an abrasive coating adhered to said front side; and
   a back up pad comprising a resilient, open cell foam layer, having a front surface, said foam layer comprising a polyurethane polymer consisting essentially of the reaction product of:
      (a) at least one polyether polyol selected from the group consisting of ethylene oxide capped diols, ethylene oxide capped triols, and ethylene oxide capped tetrols and mixtures thereof;
      (b) methylene diphenyl diisocyanate; and
      (c) a crosslinker;
   wherein said front surface of said foam layer is adapted for attachment to said back side of said backing layer of said abrasive article.

2. The back up pad of claim 1, wherein the abrasive is attached to the back up pad with an adhesive.

3. The back up pad of claim 2, wherein the adhesive is a pressure sensitive adhesive layer disposed on said back side of said backing layer of said abrasive article.

4. The back up pad of claim 1, further comprising a facing layer attached between said front surface of said foam layer and said back side of said backing layer.

5. The back up pad of claim 3, wherein said facing layer is selected from the group consisting of cloths, nonwoven substrates, treated cloths, treated nonwoven substrates, and polymeric films.

6. The back up pad of claim 3, wherein said facing layer is selected from the group consisting of loop fabrics, cloth sheeting, vinyl sheeting, hooks, nylon coated cloths, vinyl coated nonwovens, vinyl coated cloths, and hook faced materials.

7. The back up pad of claim 1, wherein said polyether polyol comprises a polypropylene glycol polyether triol with a weight average molecular weight of approximately 6000.

8. The back up pad of claim 1, wherein said foam member is a molded foam body.

9. The back up pad of claim 1, further comprising a rigid backing plate and coupling means for transmitting drive to said abrasive article back up pad attached to a face of said foam layer opposite said back surface of said backing layer.

10. The back up pad of claim 1, wherein the abrasive is attached to the back up pad with a hook and loop attachment system.

11. The back up pad of claim 1, wherein said methylene diphenyl diisocyanate is selected from the group consisting of monomeric methylene diphenyl diisocyanate, polymeric methylene diphenyl diisocyanate, modified methylene diphenyl diisocyanate, and combinations of the foregoing.

12. The back up pad of claim 1 further including a surfactant.

13. The back up pad of claim 1 wherein the surfactant is silicone based.

14. The back up pad of claim 1 wherein the crosslinker is a polyol or an amine polyol.

15. The back up pad of claim 1 wherein the crosslinker is diethanolamine or a polyether polyol.

16. The back up pad of claim 7 wherein the polyether polyol comprises a styrene/acrylonitrile polymer grafted to an ethylene oxide end capped polypropylene glycol polyether triol.

17. The back up pad of claim 1 further including an antioxidant.

18. A back up pad suitable for use with an abrasive article having an abrasive surface and an attachment surface, the back up pad comprising:
   a resilient, open cell foam body having an attachment surface which is engageable with the attachment surface of the abrasive article, said foam body comprising a polyurethane polymer consisting essentially of the reaction product of:
      (a) at least one polyether polyol selected from the group consisting of ethylene oxide capped diols, ethylene oxide capped triols, and ethylene oxide capped tetrols and mixtures thereof;
      (b) methylene diphenyl diisocyanate; and
      (c) a crosslinker;
   wherein said foam body is adapted for detachable coupling to a drive motor.

19. The back up pad of claim 18, wherein said methylene diphenyl diisocyanate is selected from the group consisting of monomeric methylene diphenyl diisocyanate, polymeric methylene diphenyl diisocyanate, modified methylene diisocyanate, and combinations of the foregoing.

20. The back up pad of claim 18, wherein said foam body is molded.

21. The back up pad of claim 18 wherein said attachment surface comprises an adhesive.

22. The back up pad of claim 18 wherein said attachment surface comprises a hook and loop attachment system.

23. The back up pad of claim 18 further including a surfactant.

24. The back up pad of claim 23 wherein the surfactant is silicone based.

25. The back up pad of claim 18 wherein the crosslinker is a polyol or an amine polyol.

26. The back up pad of claim 18 wherein the crosslinker is diethanolamine or a polyether polyol.

27. The back up pad of claim 18 wherein the polyether polyol is a polyproplene glycol polyether triol with a weight average molecular weight of approximately 6000.

28. The back up pad of claim 18 wherein the polyether polyol comprises a styrene/acrylonitrile polymer grafted to an ethylene oxide end capped polyproplene glycol polyether triol.

29. The back up pad of claim 18 further including an antioxidant.

* * * * *

UNITED STATES PATENT AND TRADEMARK OFFICE
CERTIFICATE OF CORRECTION

PATENT NO. : 5,962,120  
DATED : October 5, 1999  
INVENTOR(S) : Keipert, Steven J.

Page 1 of 1

It is certified that error appears in the above-identified patent and that said Letters Patent is hereby corrected as shown below:

Column 20, claim 16,
Line 15, "claim 7" should read -- claim 1 --.

Signed and Sealed this

Twenty-ninth Day of January, 2002

Attest:

*Attesting Officer*

JAMES E. ROGAN
*Director of the United States Patent and Trademark Office*